April 21, 1970  C. McCUTCHEON  3,507,044
SURVEYING INSTRUMENT
Filed July 14, 1966  3 Sheets-Sheet 2
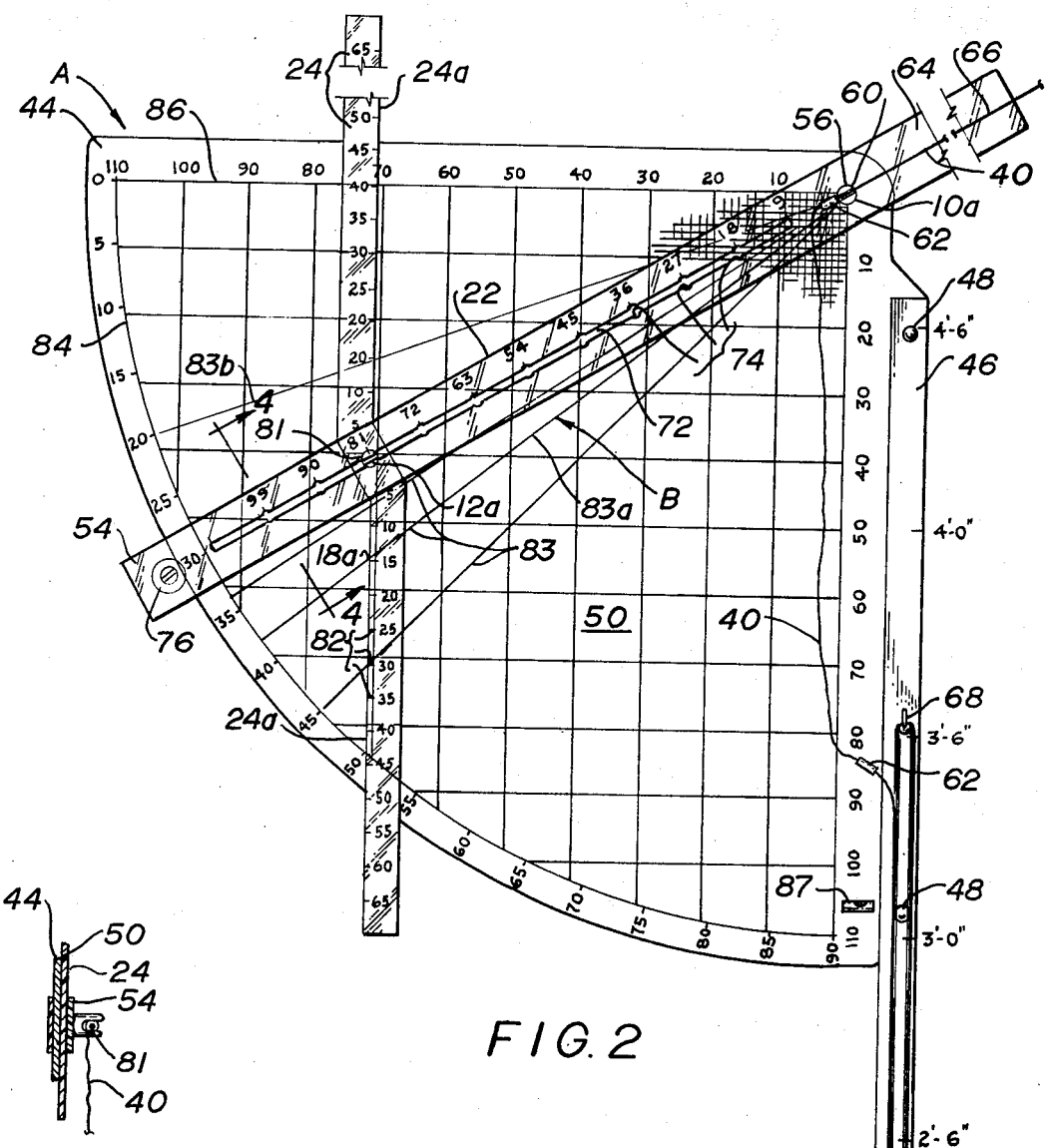
FIG. 2
FIG. 4
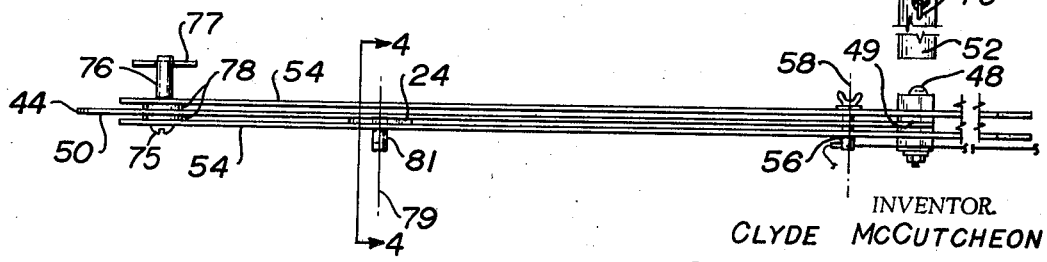
FIG. 3
INVENTOR.
CLYDE McCUTCHEON
BY Herbert Rubin
ATTORNEY

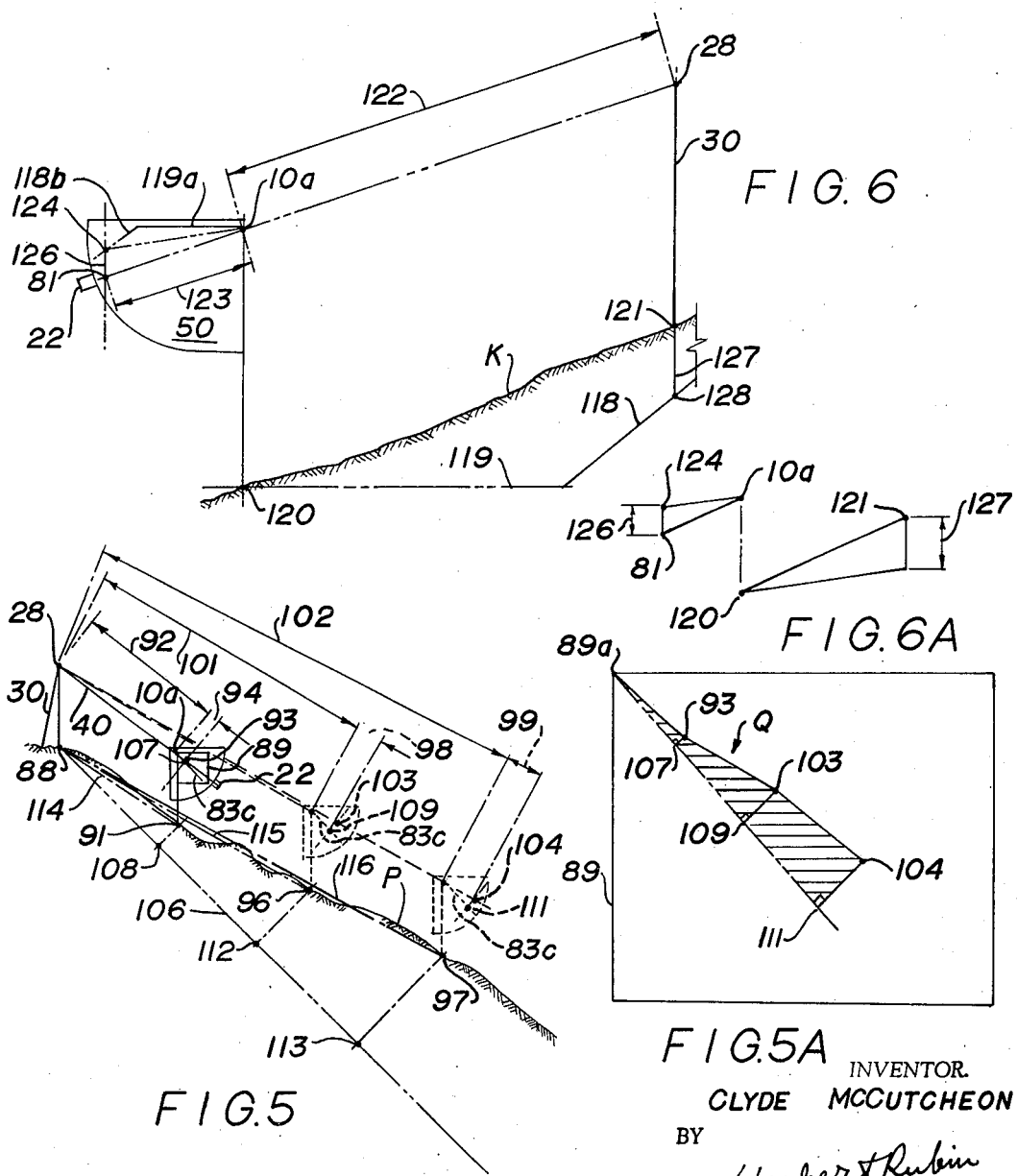

United States Patent Office 3,507,044
Patented Apr. 21, 1970

3,507,044
SURVEYING INSTRUMENT
Clyde McCutcheon, Humboldt County, Calif., assignor to Francis E. (Frank) Morrell, Salyer, Calif.
Filed July 14, 1966, Ser. No. 565,152
Int. Cl. G01c 15/00
U.S. Cl. 33—67     3 Claims

ABSTRACT OF THE DISCLOSURE

A surveying instrument including a plate having a face thereof inscribed with scale lines, an arm rotatably mounted to the plate and adapted to be aligned with a distant target, and an indicator rod rotatably carried by the arm at selective longitudinal positions thereon, in which the scale lines on the plate, and each of the arms are respectively adapted for alignment with separate sides of an imaginary vertical space triangle for determining the relative lengths thereof by geometrically similar triangles, wherein the components of the instrument represent a scaled down version of the space triangle. The indicator rod is supported on a pivot pin receivable at any of a series of notches along a slot in the alignable arm. A taut line from the target position to the plate is received in slots in an arm pivot pin and in the rod pivot pin, and held by one of a series of spaced protrusions on the line.

This invention relates to a surveying instrument; and more specifically to an instrument which provides a direct determination or reading for the solution of various surveying problems such as, but not limited to, the setting of guide stakes for cut and fill operations, plotting the profile of the earth's surface along a desired traverse line, and planimetric checking to determine the volume of deposited fill, or the amount required, to a predetermined grade line.

The solution to surveying problems, exemplified but not limited to the foregoing, may be characterized generally as determining the magnitude of one side of a space triangle lying in a vertical plane when the magnitude of one side and the direction of all three may be determined. For example, FIGURE 1 of the accompanying drawing shows a typical cross-section through the earth's surface at G with initial starting part 10 and station point 12 on traverse line 14. The problem is to determine depth dimension 16 to be shown on a grade stake for the required earth cut to reach grade point 18 lying on a predetermined grade or slope line 20 which passes through starting point 10, i.e., the magnitude of side 12–18 of space triangle 10–12–18 lying in a vertical plane when the magnitude of one side 10–12, and the direction of all three sides are known.

In the prior art with which I am familiar, the above problem, and those of the general class which it exemplifies, requires relatively complex and costly surveying procedures. A typical procedure, for example, is to employ a surveying crew (instrument man, rod man and at least one chain man) and establish the profile of the surface at G along traverse line 14. This normally requires several instrument set-ups, depending upon the natural slope of the ground, to determine the difference in elevation between station point 12 and starting point 10. A second calculation is made to determine the difference in elevation between grade point 18 and starting point 10; and then subtraction of the two elevation differences gives the required grade stake reading for the desired cut at 12. Procedures other than running a profile line may be employed, but the data required is about the same as is the relative complexity, cost, and time involved.

The foregoing prior art procedures have a number of disadvantages in addition to those mentioned above. For example, if the traverse route between stations 10 and 12 is obstructed by foliage and the like, as is often the case where such surveys are made, it is difficult to set up line-of-sight stations usually required by ordinary surveying instruments with which I am familiar. Much hacking and cutting away of underbrush may be required adding to the time and cost of operation. If during actual grading a bulldozer accidentally disturbs one of the grade stakes, the entire profile or other operation must be re-run to relocate the lost stake. This adds to the cost and time involved for completing the project.

There are a number of prior art instruments, such as that exemplified by the U.S. Patent No. 1,785,284 to W. T. Rhodes issued Dec. 16, 1930, which may be used in the aforementioned type of surveying problem; and these generally provide a graphic solution to right triangles in space. Such devices, however, and others similar thereto (see for example, the following U.S. patents: W. W. Cross, No. 2,249,728, issued July 22, 1941; D. W. Adams, No. 1,003,857, issued Sept. 19, 1911; and O. Kelly, No. 638,-846, issued Dec. 12, 1899) do not generally provide a direct means to the solution of surveying problems indicated hereinabove.

Thus it is an object of the present invention to provide a novel surveying instrument that is relatively simple and inexpensive to fabricate.

More specifically, it is an object of this invention to provide a novel surveying instrument for determining the relative positions of three points in space defining a space triangle lying in a vertical plane.

A feature and an advantage of this invention is that direct solutions to space triangles, in addition to simple right triangles, may be made with a single set-up of the novel instrument without field calculations of any kind.

Another object of this invention is to provide a novel surveying instrument for the plotting of earth surface profiles from along a desired traverse line directly in the field without the necessity of relatively extensive field notes and subsequent office procedures.

A further object of this invention is to provide a surveying instrument having as an alternative to a visual sight line, a material line for alignment of instrument components to determine directly the various measurements required in the solution of surveying problems.

A feature and an advantage of the foregoing object is that surveys may be conducted over terrain where the line of sight between station points is obstructed by foliage and the like. In this way costly and time consuming operations to clear away such obstructions are virtually eliminated.

Another object of this invention is to provide a novel surveying instrument for field computation of cut and fill volumes providing direct field readings. Actual cut or fill volumes are ascertainable with relatively little additional computation.

A feature and an advantage of the foregoing object is that field checks of actual cut or fill volumes may be made thus eliminating office planimeter operations in addition to field profile surveys which also generally require office calculations, plotting, layout, and the like. In this way many time-consuming operations, both field and office, are eliminated; and the possible incidence of errors is greatly reduced.

Another feature and an advantage of this invention is that one man working alone in the field may perform a number of surveying operations which generally require several men using prior art instruments and techniques. Moreover, the time required to perform such operations using the novel instrument and techniques of this invention is generally substantially less than with the prior art techniques with which I am familiar.

Numerous other objects, features and advantages will become apparent upon a reading of the succeeding specifications and by referring to the accompanying drawings wherein similar characters of reference refer to corresponding elements in each of the several views.

Turning now to the drawings, FIGURE 1 is a sectional view through a portion of the earth's surface, showing my invention in more or less schematic form;

FIG. 2 is a side elevation of a portoin of my invention as seen in FIG. 1 and somewhat enlarged;

FIG. 3 is a plan view looking down on the object of FIG. 2;

FIG. 4 is a sectional elevation taken along line 4—4 in FIG. 3;

FIG. 5 is a section view taken through a portion of the earth's surface exemplifying a particular application of my invention and in more or less schematic form;

FIG. 5a is a side elevation of one of the elements shown in FIG. 5 and somewhat enlarged;

FIG. 6 is a sectional view through a portion of the earth's surface showing still another application of my invention in more or less schematic form; and FIG. 6a is a diagram illustrating certain geometric relations of portions of FIG. 6.

Figure 1:
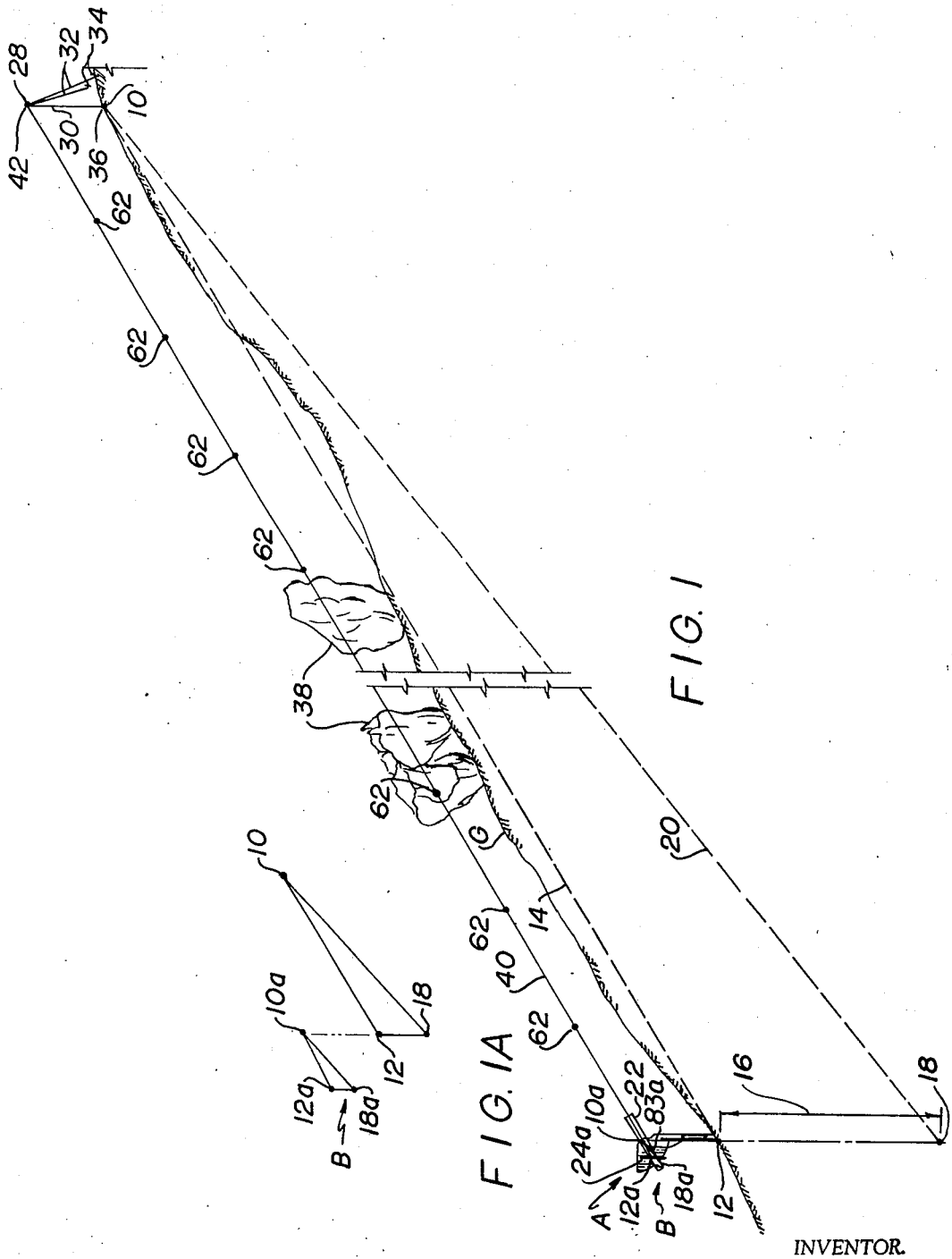
FIGURE 1a is a diagram related to certain geometric relationships associated with my invention and established in FIGURE 1.

The surveying instrument and method embodying my invention may best be understood by referring first to FIG. 1 where the instrument A is set up over station point 12 for determining depth dimension 16 which indicates the vertical distance to grade point 18 lying on grade line 20 having a predetermined slope from starting point 10. To determine dimension 16 of space triangle 10–12–18 lying in a vertical plane, my instrument provides, briefly, for the formation of reference triangle B by means of arm 22 to establish a first side 10a–12a of the reference triangle parallel to traverse line 14, which connects starting point 10 and station point 12; indicator rod 24 having line forming edge 24a to establish side 12a–18a of the reference triangle parallel to vertical line 12–18; and line 83 inscribed on the instrument plate or other suitable means to establish side 10a–18a of the reference tirangle parallel to grade line 20 having a prdetermined slope. In accordance with well known geometric principles, since all the sides of reference triangle B are parallel to space triangle 10–12–18, the corresponding sides of each, best seen for sake of comparison in FIG. 1a, are proportional to each other. Accordingly, if the actual length of one of the sides of the space triangle is determined, for example as by taping or other means of traverse line 14, the length of the other two sides of the space triangle may be calculated by comparison with the relatively short sides of the reference triangle removed from the space triangle using simple, known computation expedients.

In the use of my instrument as described above arm 22 may be positioned in parallel alignment with traverse line 14 by means of visual alignment with target point 28 located at the upper end of bucking rod 30 (an elongated member for supporting a target) held in vertical position over starting point 10 by conventional means such as braces 32 secured at the earth's surface at anchor point 34. The height of the bucking rod above the earth's surface is determined by the position of shoe 36 which is located to establish the height of target point 28 at the same height above the ground as reference triangle apex 10a is above station point 12. In some instances such visual alignment is obstructed because of shrubs or other foliage 38 as seen in FIG. 1. It is a feature and in advantage of my invention to establish a material ine 40 parallel to traverse line 14 which includes at east a segment to provide a reference for the arm to establish side 10a–12a of the refernce triangle in alignment with such segment and hence parallel to traverse line 14. More particularly, the material line 40 includes free end 42 which may be supported at target point 28 and a point coincident with apex 10a of the reference triangle at B, the terminal point of line 40 for positioning over a particular station point such as that at 12. Means to be explained in greater detail hereinafter are provided to support sight line 40 at the terminal point 10a with the line held taut along the route connecting point 10a and target 28. In this way, the longitudinal axis of the artificial sight line is substantially parallel to traverse line 14, except for minor sag which generally does not interfere with the accuracy of the instrument over the distances between stations with which it is generally employed. Such a material line may be guided through foliage 38 with a minimum of cutting or chopping of such obstructions required and providing true alignment of the line from target point 28 to the apex of the reference triangle at terminal point 10a.

The portion of my invention shown at A is seen in greater detail and may be explained further with reference to FIG. 2. The reference triangle B is established on one face 50 of instrument plate 44 which in turn is held secured in a slot 49 of support leg 46 by means of nut and bolt assemblies 48, or other suitable expedients. I prefer that plate 44 be fabricated of some light weight material such as aluminum, although other metals or plywood or the like may be employed. Similarly, support leg 46 may be fabricated of wood, metal or other suitable material. Arm 22 in the embodiment shown comprises opposing elongate bars 54 having one end pivotally secured to plate 44 by means of pin 56 which passes through apex 10a of the reference triangle which also defines a reference point on the face of the instrument, pin 56 having longitudinal reference axis 58 normal to face 50 of the instrument plate. Pin 56 is shaped so that the end protruding outwardly from instrument face 50 forms a boss having lateral slot 60 formed therethrough into which line 40 may be inserted and held by means of protrusion 62, one of a plurality of such protrusions secured to the line at predetermined intervals therealong. Portion 64 of elongate bar 54 extends outward beyond pivot pin 56 and are inscribed thereon with a longitudinal center line mark 66 for alignment with artificial sight line 40 when the line is extended taut between two points, as explained hereinabove during the use of the instrument. Excess line not in use for a particular set-up may be stored by looping about upper and lower cable holder brackets 68 and 70 suitably shaped and secured to support leg 46.

Elongate bar 54 adjacent to instrument face 50 is formed with a longitudinal slot 72 therethrough which also has fabricated therealong notches 74 denoted as indicated to a convenient scale factor in feet, in this case every nine feet. Arm assembly 22 is completed with a clamp assembly 76, threaded with screw 75 and including thumb member 77, so that the arm may be fixed in position about pin 56 by rotating member 77 with the thumb and increasing the frictional resistance of drag washers 78 against instrument plate 44, best seen in FIG. 3. Thus by alignment of arm 22, either visually or by means of line 40, the longitudinal axis of bar 54 immediately adjacent to face 50 of the instrument plate establishes a line on face 50 parallel to the longitudinal axis of the bar and passing through reference axis 58.

Indicator rod 24 is in the form of an elongate rod rotatably supported about its transverse axis 79 by means of movable swivel pin 81 which is mounted and located at selected positions, i.e., notches 74 along longitudinal slots 72 of arm 22. In this way indicator rod 24 is mounted immediately between instrument face 50 and one of the bars 54 of indicator arm 22. Although bars 54 and indicator rod 24 may be fabricated of suitable metal, wood or the like, I prefer a transparent plastic material which is light and makes reading of the instrument relatively easy. As can be seen in FIG. 2 elongate bar 24 is shaped to form a more or less continuous line forming edge 24a which is interrupted at its central portion by an offset in the bar itself to provide body at the bar's pivot point about which it is rotatably secured by means of swivel pin 81 to arm 22. The upper and lower portions of line defining edge 24a are colinear, and the extension thereof through the central portion of indicator bar 24 intersects indicator rod traverse axis 79. It is further to be noted that indicator bar 24 is calibrated in some convenient multiple of feet, as by inscribed lines 82 having as a point of origin the intersection of axis 79 in line connecting edges 24a. The scale used is the same as that selected for the notch intervals in arm 22 whose point of origin is the intersection of axis 58 and longitudinal axis of arm 22. Arm 24 rotates freely about pin 81 and may hang freely therefrom thus aligning edge 24a vertically when the entire instrument is positioned with face 50 of the instrument plate in a vertical plane. Face 50 of the instrument plate may be inscribed with slope reference lines 83 denoting particular angles as designated along graduated arc line 84 with respect to instrument reference line 86 which also passes through reference axis 58. Slope reference lines 83 also denote selected predetermined slopes with respect to reference point 10a when the instrument is positioned with face 50 in a vertical plane and reference line 86 substantially horizontal. In this manner a particular slope reference line 83a may be oriented to establish side 10a–18a of the reference triangle parallel to a given grade line of predetermined slope, such as that 10–18 in the actual problem illustrated above and in a manner further explained hereinafter.

As illustrated in FIG. 2, instrument A and the various components thereof are in actual operating position as would be the case in an upslope solution of the problem indicated in FIG. 1 and described earlier. More particularly, the instrument operator first establishes bucking rod 30 over starting point 10 to establish target point 28 in the manner described earlier. The operator then proceeds to station point 12 and places the instrument with support leg 46 just upslope from the station point by a distance sufficient to accommodate the grade stake which is to be placed therein in the ground. The distance to station point 12 may be taped or otherwise determined by suitable means before or after instrument readings are taken; or, alternatively, when line 40 is employed, the distance from starting point 10 to station point 12 may be determined by observing the number of protrusions 62 employed to establish the artificial sight line, once the instrument has been placed in operating position. Assuming first that artificial sight line 40 is not to be used in this particular set up the operator first places the instrument into position with foot 52 of support leg 46 just upslope from station point 12 by the amount necessary to position a stake directly adjacent and down slope thereto. Support leg 46 is then aligned vertically in one direction by means of instrument leveling bubble 87 which is suitably secured either to the leg itself or, as shown in the figure, instrument face 50. At the same time face 50 of the instrument plate oriented down slope from leg 46, is vertically aligned visually by means of sighting therealong and aligning the face substantially coplanar with bucking rod 30, which also plumbs the support leg in the direction to which leveling bubble 87 is not sensitive. After these preliminary adjustments, apex point 10a, which may also be designated as the reference point of the instrument, is in substantial vertical alignment with station point 12 and grade point 18, a point directly below station point 12. The operator then loosens thumb latch 77 and visually aligns the longitudinal axis of arm 22 with the line of sight defined by target point 28 and reference axis 58. This is accomplished by rotating pin 56 so that diametrical slot 60 is in alignment with the longitudinal slot 72 in arm 22; and also by rotating swivel pin 81 so that a similar longitudinal slot therein is in similar alignment. The operator's view for then adjusting arm 22 about pin 56 to achieve alignment with line 28–10a is substantially that shown in FIG. 4, disregarding the presence of line cable 40 which in the present example is not in use. Concurrently, indicator rod 24 depends freely from pin 81; and due to the substantially horizontal orientation of reference line 86 achieved by centering bubble of instrument level 87, whatever particular slope reference line 83a is inscribed with the same slope as grade line 20 is positioned parallel to such grade line during this actual instrument reading. Thus in the particular illustration given it can be seen that arm 22 establishes a line on the instrument face 50 parallel to traverse line 14; indicator bar 24 defines a line parallel to the vertical line connecting station point 12 and grade point 18; and particular slope reference line 83a designates a line parallel to the actual grade line 20 of predetermined slope. The placement of movable swivel pin 81 along longitudinal slot 72 is made to correspond to the scale distance therealong from reference point 10a to the measured distance from starting point 10 to a station point 12, such measured distance having been determined in the manner indicated hereinabove. Depth dimension 16 may now be read directly along line forming edge 24a at that edge's intersection with particular slope line 83a; namely, in the example indicated in FIG. 1 and shown in detail in the instrument board at FIG. 2, at 14¼ feet, grade line 20 being shown at a slope of about 9⅜ to 12, or an angle with a horizontal of about 38 degrees. It should also be noted that the distance along grade line 20 from station point 10 to grade point 18 could also be read directly from slope reference 83a on the instrument board, were that line to be calibrated to the same scale as the calibrations on indicator rod 24 and arm 22. Alternatively, as indicated in FIG. 2, such slope distance may be read by swinging an arc from point 18a to horizontal reference line 86 which is indicated to be calibrated to the same scale in feet as the aforementioned indicator rod and arm.

An important feature and advantage of this invention is that the above-described operation could be performed by aligning arm 22 with reference point 10a and target point 28 when such alignment is not visually practicable, and/or it is desirable to calculate the distance between the target and the instrument without the extra step of taping or otherwise determining the distance. This may be accomplished as indicated above by use of line cable 40, which may be fabricated of 9/16" diameter wire cable, having free end 42 secured to target point 28. Such securement may be accomplished by means of a protrusion 62 attached to the tip of the cable at end 42; target point 28 may be provided with a slot through which the cable itself may be inserted but which prevents passage therethrough of end protrusion 62. The aforementioned assembly is substantially similar to the connection of the intermediate point along the cable through slot 60 in pin 56 utilizing the nearest protrusion thereto.

After setting up sight line 40 between target point 28 and reference point 10a, face 50 may be positioned substantially coplanar with bucking rod 30 by swinging the instrument so that the longitudinal axis of arm 22 is in alignment with the vertical plane of line 40. Concurrently, arm 22 is positioned to align the longitudinal axis thereof with line 40 to define line 10a–12a of the reference triangle.

It is also to be noted that my instrument may be used where the starting point of the survey is downslope from the particular station point where a reading is desired. In such instance it is nearly always more convenient to use the sight line cable even if the line of sight between station point and starting point is unobstructed. This is so because the instrument plate of the instrument is always oriented to the downslope side of leg 46, which in down slope sighting means toward the starting point. Although I do not show such an arrangement on the accompanying drawings, it may be readily understood that the setup is nearly the same as it is for the example just illustrated, except that line cable 40 is threaded through the slot provided in pin 81 so that it may then be secured by particular protrusion 62 in slot 60 of pin 56. Alignment of arm 22 with line cable 40 is then virtually automatic because of the necessity of stringing the line through pin 81. Otherwise, the various operations are substantially the same as those described in the example above in respect to FIG. 1. Certain exceptions should be noted, however; for example, the reference triangle formed on the face of the instrument board is oriented with the apex corresponding to reference point 10a pointing in a direction opposite to that of the space triangle whose sides are being determined. This is so because the distance away from the starting point is scaled off along the longitudinal axis of arm 22 in the direction opposite to that from the actual starting point. Consequently, reference triangle B is established on the face of the instrument in an inverted manner, so that readings for cuts occur at the intersection of the slope reference line on the instrument plate and the upper line forming edge of indicator 24. Such variations in the use of the instrument, however, do not alter the substantial similarity of such operation with upslope readings, and is believed would be apparent to an operator familiar with the use of the instrument.

It should also be noted that although in the two illustrations given hereinabove, wherein the distance to be determined on the space triangle is that for a cut to reach a point on a grade line of predetermined slope below the earth's surface at that particular station point, the grade line could involve a reading for a grade point directly above the particular station point, i.e., indicating fill. In the upslope case of FIGURE 1 the upper portion of indicator arm 24 would be read at the intersection of its edge 24a with a line such as slope reference line 83b occurring above point 12a on the reference triangle and in the downslope case, the reading would be on the lower portion of arm 24 where it would intersect a slope line below point 12a.

Additional applications of the use of my instrument may be seen by first referring to FIG. 5 in the accompanying drawing wherein it is desired to obtain a profile of the earth's surface P starting at point 88 thereon. For such operation a portion of suitable recording paper 89 is mounted on face 50 of the instrument plate preferably oriented so that corner 89a of the paper coincides with reference point 10a. Again bucking rod 30 is installed as described hereinabove at station 88 and the instrument mounted over a first station point 91 in a manner substantially similar to the setup in respect to the problem set forth hereinabove. Arm 22 is aligned with target point 28 as explained earlier, using either direct visual alignment or sight line 40 shown in FIG. 5. Profile traverse distance 92 is next determined, either by means of a particular protrusion used with sight line 40 or by conventional taping, and first profile point 93 is marked on the paper in alignment with the longitudinal axis of arm 22 at a distance nidicated by dimension 94 there along from point 10a proportional to distance 92. The same operation is repeated at subsequent stations along the profile such as second profile station 96 and third profile station 97 located, respectively, scale distances 98 and 99 away from reference point 10a; such scale distances corresponding to actual profile traverse distances 101 and 102. Such subsequent instrument readings establish subsequent profile points 103 and 104 on recording paper 89. Successive stations along the profile traverse line similar to those at 91, 96 and 97 may be made thus giving an extensive profile of the earth's terrain Q on the recording paper. Thus it is seen that a further feature and an advantage of my invention is that a profile along the earth's surface may be determined quickly and relatively easily with a single operator using my instrument in the field.

A further application of my invention may be understood by again referring to FIGS. 5 and 5a. Suppose that at the same time the profile survey illustrated above is being run, it is desirable to determine the total amount of cut required to contour the earth's surface to grade line 106. To achieve this result, even at the same time as running the profile, it is merely necessary to manipulate indicator rod 24 to the various positions along the longitudinal axis of arm 22 indicated above as points 93, 103 and 104. When the instrument is set up for the location of the aforementioned points, indicator arm 24 may be positioned so as to cause line indicating edge 24a to be at right angles to the particular slope reference line 83c parallel to grade line 106. Such right angularity may easily be achieved by forming the various calibration lines 82 on arm 24 at right angles to edges 24a, and then aligning such calibration lines visually with a desired slope line, such as line 83c. The intersection of indicator rod 24 in slope reference line 83c may be read in a manner similar to that described above in respect to grade stake readings; thus the reading on the instrument board from point 93 to point 107 indicates the normal distance from point 91 to point 108 on grade line 106. Similarly, readings from points 103 to 109 and from 104 to 111 give the direct measurement of the normal distance from points 96 to 112 and 97 to 113, respectively. At the same time the angles formed between slope line 106 and traverse lines 114, 115, and 116 may be determined by direct readings from the graduated arc line 84 on the instrument face 50. With the foregoing information it is evident by those having ordinary skill in the trigonometric arts that the area indicated in the shaded portion of FIG. 5a may be computed, and by well known techniques total volumes to sections of the earth in the vicinity of profile P may be computed. A distinct feature and advantage of my invention, however, in making such fill calculations is that the profile and offset readings, as well as the angle readings indicated above, may be made by a single operator in the field, thus minimizing the total manpower and subsequent office computations necessary to complete such calculations.

It should also be noted that although the foregoing illustration indicates a method for determining a volume of cut to be removed from the earth's surface to arrive at a given slope line, the same technique may be applied to determine the amount of fill necessary to change a given profile of the earth's surface to one being raised in general elevation.

Still another useful application of my invention is exemplified in FIGS. 6 and 6a. Here a portion of the earth's surface K is shown over a predetermined and desired profile to be cut therein at lines 118 and 119 having predetermined slopes and directions in respect to starting point 120. In this application, I provide lines 188b and 119a on face 50 of my instrument, such lines bearing the same space relationship to point 10a that lines 118 and 119 bear to starting point 120, it being appreciated that lines 118 and 119 are predetermined design lines for a predetermined compound profile. I then set my instrument up over point 120 in a manner similar to that described earlier in respect to station point 12. In this case I select various station points such as point 121 wherein bucking rod 30 is placed thereon in vertical alignment. Dimension 122 is determined in accordance with techniques described earlier in this specification, and arm 22 of the instrument is aligned with its longitudinal axis in alignment with ponts 10a and target point 28. Bar 24 is positioned away from point 10a a distance 123 which is in scale to correspond to distance 122, and is permitted to swing about pin 81 located in the longitudinal slot of arm 22. A reading is then taken at the intersection of edge 24a and line 118b on instrument face 50, such intersection being at point 124 and giving a reading of dimension 126 equal to the required vertical depth 127 to reach grade point 128. In this manner my instrument has a remarkable application whereby the profile of a roadbed may be inscribed thereon, for example by means of adhesive tape or the like, and grade stakes may be quickly and relatively easily set up in the field utilizing only one or two men, rather than an entire surveying party as heretofore has been generally required.

An important feature of my invention is that in the event grade stakes are disturbed, they may be readily relocated with a minimum of time and effort. This is accomplished using my invention because it is merely necessary to make a single instrument setup away from the original starting point, and in the manner described hereinabove re-establish the given grade or profile stake for a given station. No intervening instrument setup stations need generally be located, and an entire survey or profile run need not be repeated in order to merely relocate a single lost stake.

What is claimed is:

1. A surveying instrument for determining the relative positions of three points of a space triangle lying in a vertical plane by establishing a similar relatively smaller reference triangle, comprising:
   an instrument plate having means defining a reference point proximate thereto;
   support means adapted for disposing said plate with a face thereof parallel to the plane of said space triangle and with said reference point in substantial vertical alignment with one point of said space triangle;
   an elongated arm having one end pivotally mounted relative to said plate about a reference axis normal to said face and passing through said reference point, said arm having means longitudinally thereon adapted for defining a line on said face passing through said reference point parallel to a first side of said space triangle to establish a first side of said reference triangle; and
   an indicator rod rotatably mounted about a transverse axis thereof with said transverse axis normal to said face and located at a selected position on said arm, said rod having means adapted for defining a second line on said face parallel to a second side of said space triangle to establish a second side of said reference triangle;
   means defining a third line on said face parallel to a third side of said space triangle to establish a third side of said reference triangle;
   a material line having the free end thereof adapted for support at a point remote from said instrument, said material line being calibrated from said free end and comprising a plurality of protrusions disposed therealong at predetermined intervals; and
   a boss pivotally secured to said instrument and extending outwardly therefrom with a longitudinal axis of said boss coincident with said reference axis, said boss being formed with a lateral slot defining an opening along opposite sides and at the outer end of said boss, the width of said slot being at least as large as the width of said material line and smaller than the dimension of said protrusions normal to the axis of said material line, whereby said material line may be releasably engaged and supported at a point located along said reference axis proximate one end of said elongated arm for alignment of the longitudinal axis thereof with said material line.

2. The surveying instrument as defined in claim 1, said arm comprising means for visual alignment of the longitudinal axis thereof with a target point remote from said instrument.

3. A surveying instrument comprising:
   an instrument plate having a face;
   an arm pivotally mounted to said plate about a reference axis normal to said face and being adapted to define a first reference line on said face intersecting said reference axis, said arm having means thereon for aligning said first reference line with a distant target and being formed with index notches at spaced locations therealong coincident with said first reference line;
   an indicator rod rotatably carried by said arm about an axis normal to said face and passing through said first reference line at a preselected spaced distance from said reference axis and adapted to define a second reference line on said face intersecting the axis connecting said arm and rod, said rod being formed with a transverse pin rotatably engageable with a selected one of said notches for positioning said rod axis at selected spaced distances from said reference axis;
   a material line adapted to be secured at one end thereof at a distant target, and said arm being formed with means for securing the other end of said material line to said arm at a point coincident with said first reference line for alignment thereof with said material line; and
   means carried by said plate defining a third line on said face intersecting said reference axis and said second reference line to establish a reference triangle by said first, second and third reference lines.

References Cited

UNITED STATES PATENTS

| 1,145,050 | 7/1915 | Yates | 33—67 |
| 1,225,514 | 5/1917 | Sistare | 33—75 |
| 1,490,111 | 4/1924 | Janson et al. | 33—75 |
| 2,822,618 | 2/1958 | Wendel. | |
| 2,872,733 | 2/1959 | Chew. | |
| 3,019,531 | 2/1962 | Adkins | 33—67 |

FOREIGN PATENTS

| 27,165 | 12/1907 | Great Britain. |
| 2,468 | 2/1910 | Great Britain. |
| 49,922 | 8/1921 | Sweden. |
| 158,214 | 3/1957 | Sweden. |
| 148,800 | 10/1931 | Switzerland. |

ROBERT B. HULL, Primary Examiner

U.S. Cl. X.R.

33—1, 71, 70, 137